(12) United States Patent
Watanabe

(10) Patent No.: US 6,577,779 B2
(45) Date of Patent: Jun. 10, 2003

(54) FERRULE CONNECTION TYPE OPTICAL ISOLATOR WITH OPTICAL FIBER

(75) Inventor: Toshiaki Watanabe, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/765,352

(22) Filed: Jan. 22, 2001

(65) Prior Publication Data

US 2001/0012422 A1 Aug. 9, 2001

(30) Foreign Application Priority Data

Jan. 28, 2000 (JP) ........................................ 2000-020778

(51) Int. Cl.[7] .......................... G02F 1/295; G02B 5/30; G02B 6/27
(52) U.S. Cl. ................... 385/11; 385/6; 385/57; 385/72; 359/280
(58) Field of Search ........................ 385/57, 72, 70, 385/91, 11, 6; 359/903, 280, 282

(56) References Cited

U.S. PATENT DOCUMENTS

| | | | | |
|---|---|---|---|---|
| 3,701,131 A | * | 10/1972 | Brauser et al. | 365/122 |
| 5,293,438 A | * | 3/1994 | Konno et al. | 385/35 |
| 5,452,122 A | * | 9/1995 | Tsuneda et al. | 359/281 |
| 5,969,849 A | * | 10/1999 | Chen | 359/304 |
| 6,168,319 B1 | * | 1/2001 | Francis | 385/55 |
| 6,275,336 B1 | * | 8/2001 | Yoshikawa et al. | 359/484 |
| 6,421,176 B1 | * | 7/2002 | Takahashi et al. | 359/281 |
| 6,480,636 B1 | * | 11/2002 | Satoh et al. | 385/11 |

FOREIGN PATENT DOCUMENTS

| | | | | |
|---|---|---|---|---|
| JP | 01013506 A | * | 1/1989 | G02B/06/36 |
| JP | 06-088926 | | 3/1994 | G02B/6/42 |
| JP | 06-325299 | | 12/1997 | G02B/27/28 |

* cited by examiner

Primary Examiner—Robert H. Kim
Assistant Examiner—Krystyna Suchecki
(74) Attorney, Agent, or Firm—Oliff & Berridge, PLC

(57) ABSTRACT

A ferrule connection optical isolator with an optical fiber, wherein the optical isolator includes a ferrule with at least one processed end surface. The optical fiber consists of two kinds of materials and has a concentric level difference between the materials. A small cylindrical magnet having a size larger than the outer diameter of the level difference portion but smaller than the outermost diameter of the ferrule is connected to the level difference portion. A guide ring is inserted and fixed in the magnet, and an optical element that consists of at least one polarizer and at least one Faraday rotator is connected and fixed in the guide ring.

21 Claims, 2 Drawing Sheets

FERRULE CONNECTION TYPE OPTICAL ISOLATOR WITH OPTICAL FIBER

BACKGROUND OF THE INVENTION

1. Field of the Invention

The present invention relates to an optical isolator with an optical fiber used for optical communication, optical information processing, optical measurement and so forth.

2. Related Art

Optical isolators are used for optical amplifiers, semiconductor laser units and so forth.

These optical isolators comprise two of polarizers fixed to each other with a relative angle of about 45° via a Faraday rotator inserted between them, which has a Faraday rotation angle of about 45°. They have an effect for passing through light of the forward direction but shielding light of the reverse direction.

Recently, smaller size, large scale production and lower cost of these optical isolators are strongly desired, and optical isolators with an optical fiber, in which an optical isolator and an optical fiber are integrated, have been proposed as a measure for answering the aforementioned demands. For example, in the optical isolator disclosed in Japanese Patent Laid-open Publication No. 6-88926, it is attempted to directly attach an optical isolator to a ferrule-processed end of an optical fiber. There is disclosed a method of assembling an isolator by utilizing a shape protruding from a ferrule, which is composed of glass tube or ceramics such as those of Zr, in order to secure bonding strength of the parts. However, with the shape disclosed therein, positional fixation of an optical element (it consists of a polarizer and a Faraday rotator, and it is also called an isolator element) is quite difficult. The facilitation of the positional fixation depends on the dimensional accuracy of the internal diameter of magnet and the outer diameter of the optical element, and it eventually depends on the outer peripheral shape of the glass tube part. Therefore, the degree of freedom concerning the shape of the optical element will eventually be lost.

Further, in an example disclosed in Japanese Patent Laid-open Publication No. 9-325299, it is necessary to additionally use a metal member having a level difference for fixing the element around the ferrule in order to integrate the optical isolator element, a permanent magnet and an optical fiber held by the ferrule. Therefore, it suffers from a drawback that it cannot use general-purpose parts, and therefore the cost becomes high.

SUMMARY OF THE INVENTION

Therefore, the present invention was accomplished in view of the aforementioned problems, and its object is to provide a reliable and low cost ferrule connection type optical isolator with the optical fiber that can connect and integrate an optical isolator element, a permanent magnet and an optical fiber held by a ferrule by using only general-purpose parts that neither have a special shape nor are subjected to a special processing and can realize positional adjustment in assembly with high precision while securing the degree of freedom for the shape of optical element.

In order to achieve the aforementioned object, the present invention provides a ferrule connection type optical isolator with an optical fiber, wherein the optical isolator comprises a ferrule in which at least one processed end surface of an optical fiber consists of two kinds of materials and which has a concentric level difference between the different kinds of materials, a small cylindrical magnet having a size larger than the outer diameter of the level difference portion but smaller than the outermost diameter of the ferrule is connected to the level difference portion, a guide ring is inserted and fixed in the magnet, and an optical element that consists of at least one polarizer and at least one Faraday rotator is connected and fixed in the guide ring.

Since the optical isolator of the present invention uses two kinds of constitutional materials for the ferrule, and connects and fixes the optical isolator element and the optical fiber by utilizing the level difference of the constitutional members as described above, it can be a reliable and low cost ferrule connection type optical isolator with the optical fiber that can connect and integrate an optical isolator element, a permanent magnet and an optical fiber held by a ferrule by using only general-purpose parts that neither have a special shape nor are subjected to a special processing and is undergone positional adjustment in assembly with high precision while securing the degree of freedom for the shape of optical element.

In the above optical isolator, an end portion of the guide ring on the ferrule side may be made perpendicular to the length direction of the guide ring, and the guide ring in which the optical element is connected and fixed beforehand may be inserted into the cylindrical magnet to adjust its position so as to conform to the shape of the protrusion of the ferrule end for positional adjustment with respect to the ferrule end.

This structure enables easy and highly precise positional adjustment in assembly, and thus cost reduction can be contemplated.

Further, in the above optical isolator, the element center position of the Faraday rotator to be connected and fixed is preferably located outside the magnetic field center of the magnet disposed on outer periphery of the optical element viewing from the end of the ferrule.

Such a structure enables easy insertion and fixation of the optical element in the guide ring thanks to the magnetic field of the magnet, and it can also prevent variation of the connecting position of the optical element.

Furthermore, in the above optical isolator, the guide ring preferably consists of a magnetic substance, and the center position of the guide ring is preferably located outside the magnetic field center of the magnet viewing from the end of the ferrule.

Such a structure enables easy insertion and fixation of the optical element, which is located and fixed in the guide ring beforehand, in the magnet together with the guide ring thanks to the magnetic field of the magnet.

Furthermore, the present invention also provides a ferrule connection type optical isolator with an optical fiber, wherein the optical isolator comprises a ferrule in which at least one processed end surface of an optical fiber consists of two kinds of materials and which has a concentric level difference between the different kinds of materials, a guide panel having a processed end of a size larger than the outer diameter of the level difference portion but smaller than the outermost diameter of the ferrule on the ferrule side is disposed on the level difference portion, which guide panel is positioned by the ferrule level difference when it is connected and fixed and serves as means for compensating the level difference, a magnet is connected and fixed on a side of the guide panel opposite to the side on which the ferrule is connected, the magnet has a cylindrical pocket having an inner diameter larger than the outermost diameter of the optical element or square prismatic pocket or inserting the optical element, and the optical element is fixed in the magnet.

The optical isolator of the structure described above also can be a reliable and low cost ferrule connection type optical isolator with the optical fiber that can connect and integrate an optical isolator element, a permanent magnet and an optical fiber held by a ferrule by using only general-purpose parts that neither have a special shape nor are subjected to a special processing and is undergone positional adjustment in assembly with high precision while securing the degree of freedom for the shape of optical element.

In the above optical isolator, the guide panel can be one having a shape with a level difference portion having a size smaller than the outermost diameter of the ferrule and larger than the outer diameter of the magnet on the side opposite to the side connected to the ferrule, the magnet can be fixed on the level difference portion, the magnet has a cylindrical pocket having an inner diameter larger than the outermost diameter of the optical element or square prismatic pocket for inserting the optical element, and the optical element is fixed in the magnet.

Since the aforementioned structure of the guide panel utilizes the level difference of the ferrule, the magnet accommodating the optical element and the ferrule can easily be connected and integrated, and the positional adjustment of the optical element can easily be performed.

Furthermore, the present invention also provides a ferrule connection type optical isolator with an optical fiber, wherein the optical isolator comprises a ferrule in which at least one processed end surface of an optical fiber consists of two kinds of materials and which has a concentric level difference between the different kinds of materials, a magnet having a shoulder with two inner diameters including a first inner diameter larger than the outer diameter of the level difference portion and smaller than the outermost diameter of ferrule and a second inner diameter larger than the outer diameter of an optical element to be inserted is fitted and fixed on the level difference portion, and an optical element that comprises at least one polarizer and at least one Faraday rotator is connected and fixed in a portion having the second diameter.

The optical isolator of the structure described above also can be a reliable and low cost ferrule connection type optical isolator with the optical fiber that can connect and integrate an optical isolator element, a permanent magnet and an optical fiber held by a ferrule by using only general-purpose parts that neither have a special shape nor are subjected to a special processing and is undergone positional adjustment in assembly with high precision while securing the degree of freedom for the shape of optical element. This structure does not require the guide ring.

In addition, the present invention also provides a ferrule connection type optical isolator with an optical fiber, wherein the optical isolator comprises a ferrule in which at least one processed end surface of an optical fiber consists of two kinds of materials and which has a concentric level difference between the different kinds of materials, a part having a shoulder with two inner diameters including a first inner diameter larger than the outer diameter of the level difference portion and smaller than the outermost diameter of ferrule and a second inner diameter larger than the outer diameter of an optical element to be inserted is fitted and fixed on the level difference portion, and an optical element that comprises at least one polarizer and at least one latching type Faraday rotator is connected and fixed in a portion of the part having the second diameter.

If the Faraday rotator is of a latching type as described above, the aforementioned permanent magnet having the two of inner diameters (having a level difference) can be replaced with a part of the same shape made of a material other than magnet such as a metal part, and an effect comparable to that obtained by the magnet can be obtained with such a part.

The present invention also provides a ferrule connection type optical isolator with an optical fiber, wherein the optical isolator comprises a ferrule in which at least one processed end surface of an optical fiber consists of two kinds of materials and which has a concentric level difference between the different kinds of materials, an optical element having an outermost diameter smaller than the outer diameter of the level difference portion is positioned with respect to the ferrule and fixed on the level difference portion by using a jig, and thereafter a magnet having an inner diameter larger than the outer diameter of the level difference portion is connected and fixed to the level difference portion by utilizing the level difference.

As described above, the optical element may be positioned and fixed beforehand at the center of the ferrule by using a jig of the same shape as the aforementioned magnet, and then a cylindrical magnet may be connected and fixed. As for the jig for positioning the optical element used here, a part to be in contact with the optical element preferably has a shape processed into a round shape or a square shape conforming to the shape of the optical element.

In any of the aforementioned ferrule connection type optical isolators with an optical fiber, it is preferred that a surface of the optical element most close to the ferrule is directly connected and fixed to the ferrule.

Such a structure can provide sufficiently high reliability of the connected portion, even if the end surface of the optical fiber on the ferrule end is very small.

Further, in any of the aforementioned ferrule connection type optical isolators with an optical fiber, it is preferred that connection and fixation of parts including those of the optical element to the ferrule end are attained by using an adhesive on curing condition of 100° C. or lower, and a silicone resin type adhesive is suitable for the adhesive.

Silicone resin type adhesives show superior adhesion strength even at a curing temperature of 100° C. or lower, excellent weather resistance such as moisture resistance, heat resistance and laser damage threshold, and high light transmittance. Therefore, they are most suitable adhesives for use in light-transmitting surface.

If the connection and fixation temperature becomes high exceeding 100° C., the optical fiber may protrude or retract from the processed surface of the optical fiber. Therefore, the connection and fixation temperature is preferably 100° C. or lower.

When the aforementioned guide panel or the part having a shoulder is made of a metal, it is desirable that such a metal part should be fixed by YAG welding.

If the metal part is fixed by YAG welding, i.e., minute spot-welding method by yttrium-aluminium-garnet laser beam, it can be easily welded and fixed without thermally damaging the optical element and adversely affecting the assembly precision.

According to the present invention, the degree of freedom in the design of components for the optical element can be increased by enabling use of general-purpose processed products for optical fiber ferrules, without requiring special shapes or processing, to simplify the shapes of constitutional members for optical isolators. Thus, there can be provided a highly reliable and highly precise ferrule connection type optical isolator with an optical fiber that can realize easy positioning of parts in assembly at a low cost and firm connection and fixation.

PREFERRED EMBODIMENTS OF THE INVENTION

Hereafter, embodiments of the present invention will be explained by referring to the appended drawings. However, the present invention is not limited to these.

Figure 1:
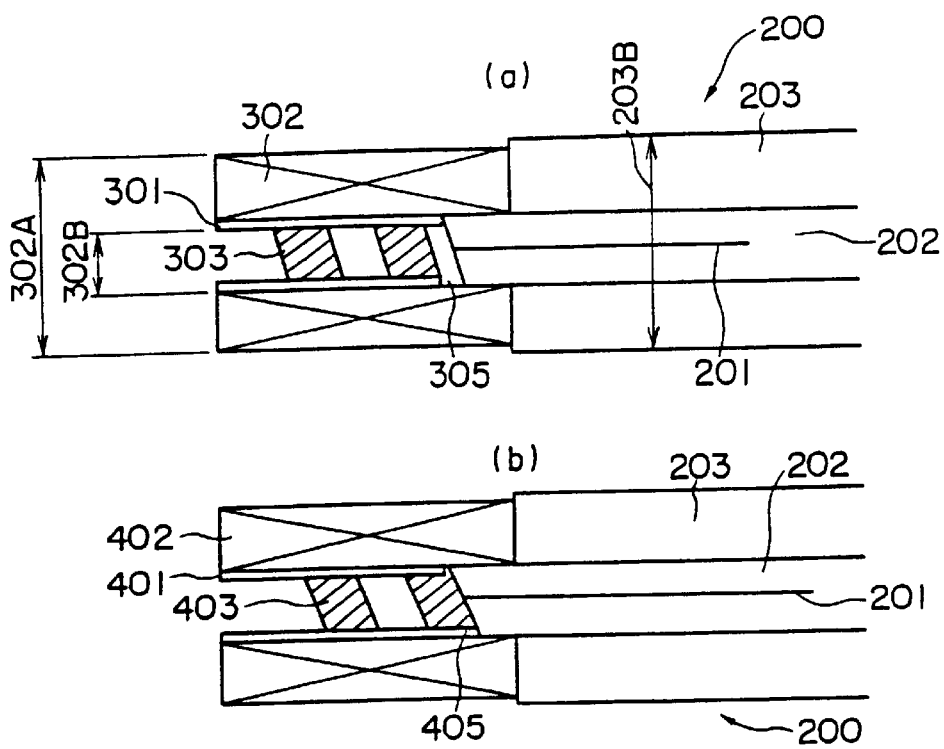
FIG. 1 includes explanatory views showing examples of the ferrule connection type optical isolator with an optical fiber of the present invention for cases where: (*a*) an air layer is formed by separating an end surface of a polarizer constituting an optical element from an oblique end surface of a ferrule center part, and (*b*) an end surface of a polarizer of optical element is adhered to an oblique end surface of a ferrule center part.
Figure 5A:
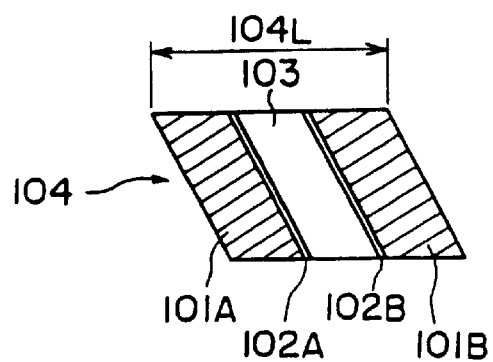
FIG. 5 is an explanatory view showing an exemplary optical element comprising polarizing glass and a Faraday rotator.
Figure 5B:
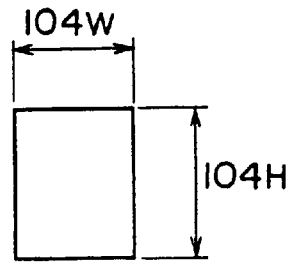

First, a representative example of the ferrule connection type optical isolator with an optical fiber of the present invention is shown in FIG. 1. Further, an optical element consisting of a polarizer and a Faraday rotator is shown in FIG. 5, and an optical fiber processed end surface of a ferrule is shown the in FIG. 6.

A ferrule 200 comprises a circumferential part 203 made of, for example, stainless steel SUS304, and a center part 202 made of ceramics such as those of Zr or glass, and holds an optical fiber 201 in a center hole of the center part 202. At least one processed end surface of the ferrule consists of two kinds of materials as described above, and the center part 202 protrudes to form a concentric level difference 202D between the different materials. The end surface of the protruding portion is obliquely processed by polishing together with the optical fiber.

Thereafter, a cylindrical small magnet (for example, Sm—Co permanent magnet) 302 having an inner diameter larger than the outer diameter of the center part 202 of this ferrule 200 and an outer diameter 302A smaller than the outer diameter of the circumferential part 203 is connected and fixed to a ferrule end surface, a guide ring 301 having an outer diameter smaller than the inner diameter 302B of the magnet and an inner diameter larger than the outer diameter of the optical element 303 is inserted into the magnet 302, and then the optical element 303 is inserted along the guide ring 301, and connected and fixed.

FIG. 1(*a*) shows a case where an end surface of a polarizer 101B that constitutes the optical element 303 is slightly separated from the oblique end surface of the ferrule center part 202 to form an air layer 305, and FIG. 1(*b*) shows a case where the end surface of the polarizer of the optical element 403 is adhered to the oblique end surface of the ferrule center part 202 (directly adhered surface 405).

As in the case shown in FIG. 1(*b*), the end of the guide ring 401 on the ferrule side may be made perpendicular to the length direction of the guide ring 401, and the guide ring 401 in which the optical element 403 is connected and fixed beforehand may be inserted into the cylindrical magnet 402 to form a directly connected surface 405 conforming to the shape of the protrusion of the ferrule end for positional adjustment with respect to the ferrule end.

If the optical element is directly connected to an end surface of an optical fiber, the reliability of the connection will be improved. However, since the connected portion is small, it is difficult to adjust the angle of the optical element and confirm the connection condition. As shown in FIG. 1(*a*), if there is an air layer 305, there is an advantage that the confirmation of the connection is easy.

Now, the function of the optical isolator will be explained by referring to FIG. 5. The optical isolator 104 comprises two of polarizers 101A and 101B, which are disposed with a relative angel of about 45°, and a Faraday rotator 103 with a Faraday rotation angle of about 45° is inserted between the polarizers and fixes them together through adhesives layers 102A and 102B. This isolator has an effect for passing through light of the forward direction but shielding light of the reverse direction. As the adhesive, it is preferable to use a silicone resin type adhesive.

If an optical isolator is assembled as explained above, general-purpose parts can be used for the ferrule parts (202, 203), and therefore the production cost can be suppressed to be low. Further, by changing the inner diameter of the guide ring 301, degree of freedom can be given for the shape of the optical element 303.

Further, it is preferable to obliquely cut the optical element 303 so as to conform to the inclination of the ferrule center part 202, so that the optical element 303 can be inserted stably.

Figure 2:
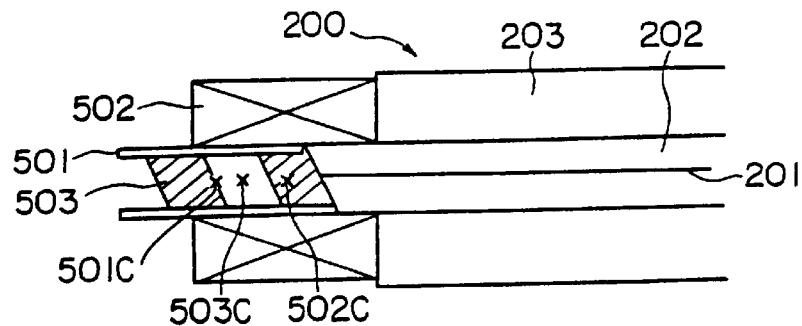
FIG. 2 is an explanatory view showing that an element center position of a Faraday rotator is located at a position outside a magnetic field center of a magnet viewing from a ferrule end in assembly of the ferrule connection type optical isolator with an optical fiber of the present invention.

As further shown in FIG. 2, by using a structure where the center 503C of Faraday rotator is located outside the magnetic field center 502C of the magnet viewing from the ferrule surface when the optical element 503 knocks against the polished ferrule end surface, the optical element 503 can be easily inserted and fixed in the guide ring 501 by the magnetic field of the magnet.

Further, the optical element 503 may be inserted into the guide ring 501, positioned and fixed therein beforehand, and then the guide ring 501 accommodating the optical element 503 may be inserted into the magnet 502. In this case, if a magnetic metal is used for the guide ring 501 and the center position of the guide ring 501 is located outside the magnetic field center of the magnet 502 viewing from the ferrule end, the optical element 503 can be easily inserted and fixed together with the guide ring 501 by the magnetic field of the magnet.

In the above structure, as for the shape of the guide ring 501, the outer shape preferably has a cylindrical shape of which outer diameter fits to the inner diameter of the magnet 502, whereas the inner shape may have a shape conforming to the shape of the optical element and may have a shape of square prism in addition to a cylindrical shape.

The material of the guide ring 501 is not limited to a metal, and it may be composed of glass or a hard plastic.

Figure 3:
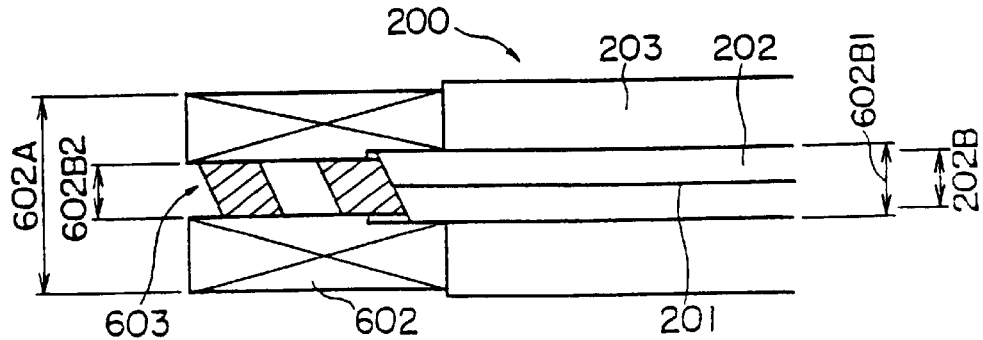
FIG. 3 is an explanatory view showing a ferrule connection type optical isolator with an optical fiber according to the present invention, which is assembled by using a magnet having a shoulder.

As another structure of the optical isolator with an optical fiber, the aforementioned guide ring may not be used, and by using a magnet 602 having two stages with inner diameters of 602B1 and 602B2 so as to have a function of the guide ring as shown in FIG. 3, the ferrule 200, the magnet 602 and the optical element 603 can easily and firmly connected and fixed, and the same function as the aforementioned isolator as an optical isolator can be realized.

That is, the magnet 602 having a shoulder with a first inner diameter 602B1 larger than the outer diameter 202B of the level difference portion but smaller than the outermost diameter of the ferrule and a second inner diameter 602B2 larger than the outer diameter of the optical element 603 to be inserted is fitted and fixed on the level difference portion of the ferrule 200, and the optical element 603 consisting of at least one polarizer and at least one Faraday rotator is connected and fixed in the portion of the second inner diameter 602B2.

For the optical isolator of the present invention, an optical element may be positioned and fixed at the ferrule center beforehand by using a jig having the same shape as the aforementioned magnet, and then a cylindrical magnet may be connected and fixed.

That is, the optical isolator may comprise a ferrule in which at least one processed end surface of an optical fiber consists of two kinds of materials and which has a concentric level difference between the different kinds of materials, an optical element having an outermost diameter smaller than the outer diameter of the level difference portion may be positioned with respect to the ferrule by using a jig, and thereafter a magnet having an inner diameter larger than the outer diameter of the level difference portion may be connected and fixed to the level difference portion by utilizing the level difference. As for the jig for positioning the optical element used in this case, its portion knocking against the optical element is preferably processed into a round or square shape conforming to the shape of the optical element.

Furthermore, if a latching type Faraday rotator is used for the Faraday rotator that constitutes the optical element 603, it is also possible to substitute a material part other than magnet, such as a metal part of the same shape, for the magnet 602 having two of inner diameters.

Figure 4:
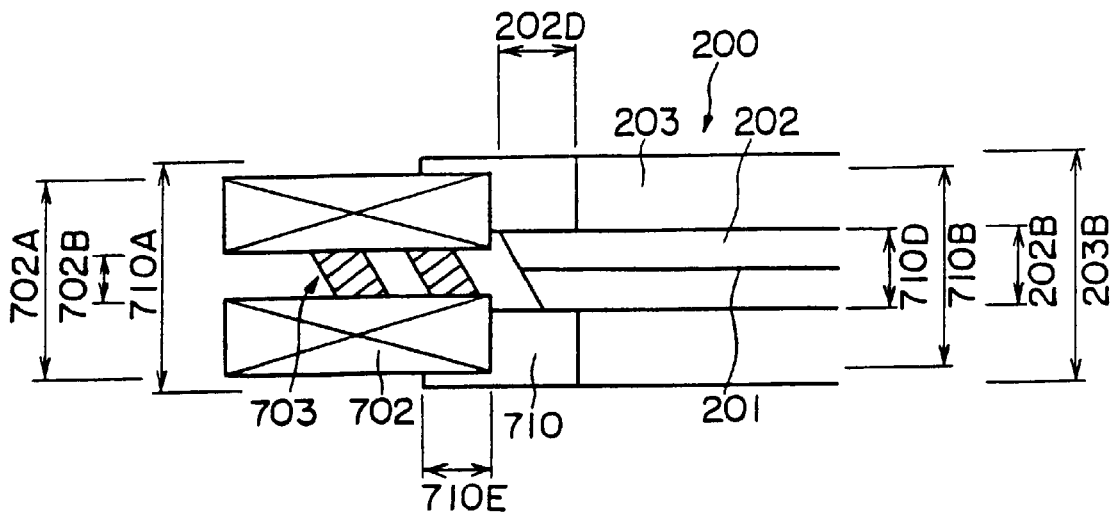
FIG. 4 is an explanatory view showing a ferrule connection type optical isolator with an optical fiber according to the present invention, which is assembled by using a guide panel.

The optical isolator shown in FIG. 4 is a ferrule connection type optical isolator with an optical fiber, wherein the optical isolator comprises a ferrule 200 in which at least one processed end surface of an optical fiber 201 consists of two kinds of materials (202, 203) and which has a concentric level difference 202D between the different kinds of materials, a guide panel 710 having a processed end of a size larger than the outer diameter 202B of the level difference portion but smaller than the outermost diameter 203B of the ferrule on the ferrule 200 side is disposed on the level difference portion, which guide panel is positioned by the ferrule level difference when it is connected and fixed and serves as means for compensating the level difference of the ferrule, a magnet 702 is connected and fixed on a side of the guide panel opposite to the side on which the ferrule is connected, the magnet has a cylindrical pocket having an inner diameter 702B larger than the outermost diameter of the optical element or square prismatic pocket for inserting the optical element, and the optical element 703 is fixed in the magnet 702.

In this case, the guide panel 710 can be one having a shape with a level difference 710E having an outer diameter 710A smaller than the outermost diameter 203B of the ferrule and an inner diameter 710B larger than the outer diameter 702A of the magnet on the side opposite to the side connected to the ferrule, the magnet 702 can be fixed on the level difference portion, the magnet can have a cylindrical pocket having an inner diameter 702B larger than the outermost diameter of the optical element 703 or square prismatic pocket for inserting the optical element, and the optical element 703 can be fixed in the magnet 702.

As described above, the magnet 702 can be connected and fixed by compensating the level difference with a metal guide panel 710 that can fit to the level difference portion of the ferrule, connecting the guide panel to the ferrule, and providing a level difference 710E for receiving the magnet at the other end of the guide panel. Further, the positional adjustment of the optical element 703 can also be performed easily.

Further, as for all of the aforementioned ferrule connection type optical isolators with an optical fiber, it is preferred that connection and fixation of parts including the optical element to the ferrule end are attained by using an adhesive on curing condition of 100° C. or lower, and a silicone resin type adhesive is suitable for the adhesive. If the temperature of connection and fixation becomes high exceeding 100° C., the optical fiber may protrude or retract from the processed surface of the optical fiber. Therefore, the connection and fixation temperature is preferably 100° C. or lower.

Silicone resin type adhesives are preferably used as mentioned above, because they show superior adhesion strength even at a curing temperature of 100° C. or lower, excellent weather resistance such as moisture resistance, heat resistance and laser damage threshold, and high light transmittance, and therefore they are suitable for connection and fixation of light-transmitting surface.

When the aforementioned guide panel or the part having a shoulder is made of a metal, it is desirable that such a metal part should be fixed by YAG welding.

The metal part is preferably fixed by YAG welding, i.e., minute spot-welding method by yttrium-aluminum-garnet laser beam, as described above, because it can be easily welded and fixed without thermally damaging the optical element and adversely affecting the assembly precision.

EXAMPLES

Hereafter, the present invention will be specifically explained with reference to the following examples of the present invention. However, the present invention is not limited to these.

Example 1

As a Faraday rotator, one comprising a bismuth-substituted rare-earth iron garnet panel (15×15×0.4 mm) of which both end surfaces were applied with non-reflective coatings for adhesives was used. As a polarizer, one comprising Polarcor (15×15×0.5 mm) produced by Corning, of which one end surface was applied with non-reflective coating for air and the other end surface was applied with non-reflective coating for adhesive was used.

A silicone adhesive was applied to the both ends of the Faraday rotator, and the non-reflective coat surface for adhesive of the polarizer was connected to these surfaces. While a magnetic field was applied to an element in the form of stack of polarizer-Faraday rotator-polarizer by a magnet, polarized light was entered into the element from the forward direction and the reverse direction. The direction for transmitting polarized light of the polarizing glass was rotated to adjust it so that the forward direction insertion loss should be minimized and the reverse direction insertion loss should be maximized, and the direction was fixed. Then, the silicone adhesive was solidified by curing. This adhered body was obliquely cut into the shape shown in FIG. 5. In the cut shape, 104W was 0.5 mm, 104H was 0.6 mm and 104L was about 1.4 mm (the shape of the element was not limited to a square shape, but it may be a round shape).

Figure 6:
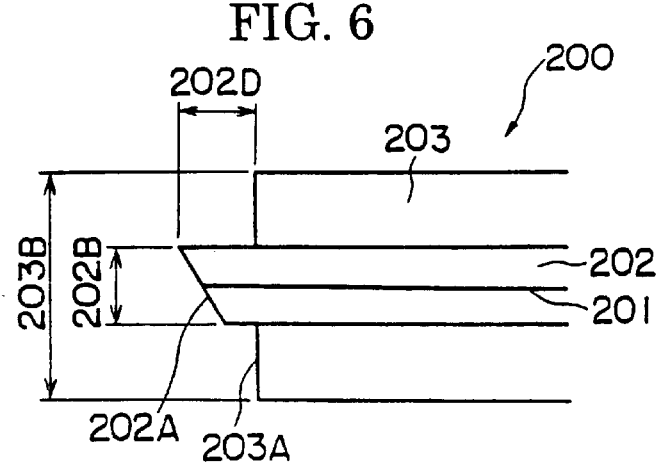
FIG. 6 is an explanatory view showing an exemplary ferrule processed end of an optical fiber.

The shape of the optical fiber processed end surface of the ferrule is shown in FIG. 6. The circumferential part 203 of the ferrule was composed of SUS304 material and had the outer diameter 203B of 2.00 mm. The ferrule center part 202 was composed of Zr ceramics and had the outer diameter 202B of 1.1 mm. The numeral 201 indicates an optical fiber. The processed end surface 202A of the optical fiber at the center of the ferrule was polished obliquely, and it showed level difference 202D with respect to the end surface of the circumferential part 203A, i.e., there was a level difference 202D between the different materials (202 and 203).

As shown in FIG. 1, a Sm—Co magnet 302 having the outer diameter 302A (1.95 mm) smaller than the outer diameter 203B of the circumferential part and the inner diameter 302B (1.13 mm) larger than the outer diameter 202B of the center part was connected and fixed to the above optical fiber processed end surface with an epoxy adhesive. An optical element 303 is connected and fixed beforehand in a guide ring 301 having an outer diameter (1.12 mm) smaller than the inner diameter 302B of the magnet and an inner diameter (0.8 mm) larger than the outer diameter of the optical element 303 with an epoxy adhesive, and the guide ring was inserted into the magnet 302 and connected and fixed with an epoxy adhesive, while securing an air layer 305 (0.1 mm) (FIG. 1(a)).

The outermost diameter of the processed end of the ferrule connection type optical isolator with an optical fiber assembled as described above could be made small, i.e., within the diameter of the circumferential part 203B of the ferrule, i.e., 2.00 mm. As for the optical characteristics, the forward direction insertion loss was 0.15 dB, the reverse direction insertion loss was 45.6 dB, and the effective light receiving diameter was 0.48 mm.

Example 2

As shown in FIG. 1(b), a guide ring 401 was inserted into a magnet 402 and an optical element 403 was directly adhered to a Zr processed surface of a ferrule center part 202 with a silicone adhesive by using the same materials as Example 1. The adhesive was used for the adhesion and fixation at 85° C. The surface of the optical element 403 adhered to the ferrule used above was previously subjected to a non-reflective coating for adhesive before the processing.

In this case, if the temperature for the connection and fixation becomes high, i.e., 100° C. or higher, the optical fiber may protrude or retract from the processed surface of the optical fiber, and therefore the connection and fixation temperature is preferably 100° C. or lower.

The outermost diameter of the processed end of the above ferrule connection type optical isolator with an optical fiber was within the outer diameter 203B of the circumferential part, i.e., 2.00 mm. As for the optical characteristics, the forward direction insertion loss was 0.18 dB, the reverse direction insertion loss was 44.6 dB, and the effective light receiving diameter was 0.48 mm.

In this case, there was observed a phenomenon that the connecting position of the optical element varied within the guide ring 401 at the time of connection and fixation of the optical element. For this phenomenon, it was found that the connecting position could be surely stabilized by locating the center 503C of the Faraday rotator in the optical element 503 at a position outside the magnetic field center 502C of the magnet viewing from a ferrule processed surface as shown in FIG. 2. This originates in the fact that the optical element (especially Faraday rotator) was attracted by the magnetic field of the magnet to the direction toward the ferrule surface. It was confirmed that the connecting position could be similarly stabilized by replacing the material of the guide ring of Example 1 with a magnetic metal through the above phenomenon.

Moreover, the same effect could be attained by replacing the aforementioned guide ring 501 with a magnet 602 having a shoulder (having two of inner diameters, the inner diameter 602B1 and the inner diameter 602B2) as shown in FIG. 3.

It was further confirmed that the inner shape of the magnet and the guide ring was not limited to a cylindrical shape, but it might be a square prism shape.

Example 3

Assembly was performed by using an optical element 703 and a guide panel 710 similar to those of Example 1. As shown in FIG. 4, the outermost diameter 710A of the guide panel 710 was preferably smaller than the outer diameter 203B of the circumferential part of the ferrule, and the inner diameter 710D was preferably larger than the outer diameter 202B of the ferrule center part. By utilizing this shape, the position of the magnet 702 accommodating the optical element 703 was adjusted with the level difference 710E to connect and fix the magnet. By using a metal for the guide panel 710, connection between the guide panel 710 and the circumferential part 203 of the ferrule may also be attained by YAG welding, and it was confirmed that adhesion firmer than that attained by an adhesive could be obtained.

Further, it was confirmed that the connection and positional fixation of the magnet 702 could easily be attained by providing a level difference 710E with the inner diameter 710B of the level difference portion, which was smaller than the outer diameter 710A of the guide panel and larger than the outer diameter 702A of the magnet, on the side of the guide panel 710 opposite to the side contacting with the ferrule to serve as a receiving part for the magnet 702.

The present invention is not limited to the embodiments described above. The above-described embodiments are mere examples, and those having the substantially same structure as that described in the appended claims and providing the similar functions and advantages are included in the scope of the present invention.

What is claimed is:

1. A ferrule connection type optical isolator, wherein the optical isolator comprises:
    a ferrule with an optical fiber, in which at least one processed end surface of the ferrule consists of two kinds of materials and which has a concentric level difference between the different kinds of materials,
    a small cylindrical magnet having a size larger than the outer diameter of the level difference portion but smaller than the outermost diameter of the ferrule and is connected to the level difference portion;
    a guide ring that is inserted and fixed in the magnet; and
    an optical element that consists of at least one polarizer and at least one Faraday rotator connected and fixed in the guide ring.

2. The ferrule connection type optical isolator according to claim 1,
    wherein an end portion of the guide ring on the ferrule side is made perpendicular to the length direction of the guide ring,
    the guide ring in which the optical element is connected and fixed beforehand is inserted into the cylindrical magnet to adjust its position so as to conform to the shape of the protrusion of the ferrule end for positional adjustment with respect to the ferrule end.

3. The ferrule connection type optical isolator with an optical fiber according to claim 1,
wherein the element center position of the Faraday rotator to be connected and fixed is located outside the magnetic field center of the magnet disposed on an outer periphery of the optical element viewed from the end of the ferrule.

4. The ferrule connection type optical isolator with an optical fiber according to claim 1,
wherein the guide ring consists of a magnetic substance; and
the center position of the guide ring is located outside the magnetic field center of the magnet disposed on the outer periphery of the guide ring as viewed from the end of the ferrule.

5. The ferrule connection type optical isolator with an optical fiber according to claim 1, wherein a surface of the optical element most close to the ferrule is directly connected and fixed to the ferrule.

6. The ferrule connection type optical isolator with an optical fiber according to claim 1, wherein connection and fixation of parts including the optical element to the ferrule end are attained by using an adhesive having a curing temperature of 100° C. or lower.

7. The ferrule connection type optical isolator with an optical fiber according to claim 6, wherein the adhesive is a silicone resin.

8. A ferrule connection type optical isolator wherein the optical isolator comprises:
a ferrule with an optical fiber, in which at least one processed end surface of the ferrule consists of two kinds of materials and which has a concentric level difference between the different kinds of materials;
a guide panel having a processed end of a size larger than the outer diameter of the level difference portion but smaller than the outermost diameter of the ferrule on the ferrule side and disposed on the level difference portion, said guide panel being positioned by the ferrule level difference when it is connected and fixed and serves as means for compensating the level difference;
a magnet connected and fixed on a side of the guide panel opposite to the side on which the ferrule is connected, said magnet having a cylindrical pocket having an inner diameter larger than the outermost diameter of the optical element or a prism-shaped pocket for inserting the optical element, and;
the optical element being fixed in the magnet.

9. The ferrule connection type optical isolator with an optical fiber according to claim 8,
wherein the guide panel has a shape with a level difference portion having a size smaller than the outermost diameter of the ferrule and larger than the outer diameter of the magnet on the side and opposite to the side connected to the ferrule;
the magnet being fixed on the level difference portion; and
the magnet having a cylindrical pocket having an inner diameter larger than the outermost diameter of the optical element or a prism-shaped pocket for inserting the optical element, and the optical element is fixed in the magnet.

10. The ferrule connection type optical isolator with an optical fiber according to claim 8, wherein a surface of the optical element most close to the ferrule is directly connected and fixed to the ferrule.

11. The ferrule connection type optical isolator with an optical fiber according to claim 8, wherein connection and fixation of parts including the optical element to the ferrule end are attained by using an adhesive having a curing temperature of 100° C. or lower.

12. The ferrule connection type optical isolator with an optical fiber according to claim 11, wherein the adhesive is a silicone resin.

13. The ferrule connection type optical isolator with an optical fiber according to claim 8, wherein, when the guide panel is made of a metal, the guide panel is fixed to the level difference portion by YAG welding.

14. A ferrule connection type optical isolator, wherein the optical isolator comprises:
a ferrule with an optical fiber, in which at least one processed end surface of the ferrule consists of two kinds of materials and which has a concentric level difference between the different kinds of materials;
a magnet having a shoulder with two inner diameters that is fitted and fixed on the level difference portion, the two inner diameters include a first inner diameter larger that the outer diameter of the level difference portion and smaller than the outermost diameter of said ferrule and a second inner diameter larger than the outer diameter of an optical element to be inserted; and
an optical element that includes at least one polarizer and at least on Faraday rotator that is connected and fixed in a portion having the second diameter.

15. The ferrule connection type optical isolator with an optical fiber according to claim 14, wherein a surface of the optical element most close to the ferrule is directly connected and fixed to the ferrule.

16. The ferrule connection type optical isolator with an optical fiber according to claim 14, wherein connection and fixation of parts including the optical element to the ferrule end are attained by using an adhesive having a curing temperature of 100° C. or lower.

17. The ferrule connection type optical isolator with an optical fiber according to claim 16, wherein the adhesive is a silicone resin.

18. A ferrule connection type optical isolator, wherein the optical isolator comprises:
a ferrule with an optical fiber, in which at least one processed end surface of the ferrule consists of two kinds of materials and which has a concentric level difference between the different kinds of materials;
an optical element having an outermost diameter smaller than the outer diameter of the level difference portion that is positioned with respect to the ferrule and fixed on the level difference portion by using a jig; and
a magnet having an inner diameter larger than the outer diameter of the level difference portion being fitted and fixed to the level difference portion by utilizing the level difference.

19. The ferrule connection type optical isolator with an optical fiber according to claim 18, wherein a surface of the optical element most close to the ferrule is directly connected and attained by using an adhesive on curing condition of 100° C. or lower.

20. The ferrule connection type optical isolator with an optical fiber according to claim 18, wherein connection and fixation of parts including the optical element to the ferrule end are attained by using an adhesive having a curing temperature of 100° C. or lower.

21. The ferrule connection type optical isolator with an optical fiber according to claim 20, wherein the adhesive is a silicone resin.

* * * * *